(12) United States Patent
Dramm et al.

(10) Patent No.: US 6,695,231 B2
(45) Date of Patent: Feb. 24, 2004

(54) IRRIGATION SYSTEM FOR GROWING PLANTS AT A GROWING FACILITY

(75) Inventors: Kurt W. Dramm, Manitowoc, WI (US); Ronald R. Greening, Manitowoc, WI (US)

(73) Assignee: Dramm Corporation, Manitowoc, WI (US)

( * ) Notice: Subject to any disclaimer, the term of this patent is extended or adjusted under 35 U.S.C. 154(b) by 0 days.

(21) Appl. No.: 10/076,338

(22) Filed: Feb. 15, 2002

(65) Prior Publication Data

US 2003/0154652 A1 Aug. 21, 2003

(51) Int. Cl.[7] ............................................... B05B 15/00
(52) U.S. Cl. ..................... 239/542; 239/569; 239/510; 239/571; 47/79
(58) Field of Search ............................ 239/542, 547, 239/569, 570, 571; 47/79

(56) References Cited

U.S. PATENT DOCUMENTS

| | | | | |
|---|---|---|---|---|
| 3,085,364 A | * | 4/1963 | Chapin .......................... 47/79 |
| 3,108,400 A | * | 10/1963 | Wolfe, Jr. ....................... 47/79 |
| 3,199,784 A | * | 8/1965 | Chapin ........................ 239/547 |
| 3,199,791 A | * | 8/1965 | Chapin ........................ 239/542 |
| 3,482,785 A | * | 12/1969 | Chapin et al. ............... 239/542 |
| 3,958,761 A | * | 5/1976 | Watanabe .................... 239/542 |
| 4,223,838 A | | 9/1980 | Maria-Vittorio-Torrisi .. 239/109 |
| 4,573,640 A | | 3/1986 | Mehoudar .................... 239/542 |
| 4,642,152 A | | 2/1987 | Chapin ....................... 156/203 |
| 4,653,695 A | | 3/1987 | Eckstein ....................... 239/542 |
| 4,687,143 A | | 8/1987 | Gorney et al. ............... 239/542 |
| 4,726,527 A | | 2/1988 | Mendenhall ................. 239/542 |
| 4,753,394 A | | 6/1988 | Goodman .................... 239/542 |
| 5,025,625 A | | 6/1991 | Morikawa ..................... 60/426 |
| 5,111,996 A | | 5/1992 | Eckstein ....................... 239/542 |
| 5,137,216 A | | 8/1992 | Hanish ........................ 239/542 |
| 5,330,107 A | | 7/1994 | Karathanos ............... 239/533.1 |
| 5,340,027 A | | 8/1994 | Yu .............................. 239/106 |
| D353,872 S | | 12/1994 | Allman ....................... D23/213 |
| 5,400,967 A | | 3/1995 | Yu .............................. 239/106 |
| 5,711,482 A | | 1/1998 | Yu ................................ 239/11 |
| 5,806,239 A | | 9/1998 | Wesolowski ................... 47/39 |
| 5,974,731 A | | 11/1999 | Wesolowski ................. 47/48.5 |
| 6,027,048 A | | 2/2000 | Mehoudar .................... 239/542 |
| 6,206,305 B1 | | 3/2001 | Mehoudar .................... 239/542 |
| 6,254,012 B1 | | 7/2001 | Fan ............................. 239/145 |

* cited by examiner

Primary Examiner—Robin O. Evans
(74) Attorney, Agent, or Firm—Foley & Lardner

(57) ABSTRACT

A drip irrigation system is disclosed for delivering an irrigation fluid from an irrigation fluid supply source to one or more plants and includes at least one pressure regulation device in fluid communication with the irrigation fluid supply source, at least one fluid delivery device coupled in fluid communication to the pressure regulation device, and a weighted emitter coupled in fluid communication to the fluid delivery device.

A kit for a drip irrigation system is also disclosed and includes at least one pressure regulation device adapted to be coupled to an irrigation fluid supply source, at least one elongated member having an internal passage adapted to couple to the pressure regulation device, at least one weighted emitter having an internal passage adapted to couple to the elongated member, and a package for the kit.

19 Claims, 4 Drawing Sheets

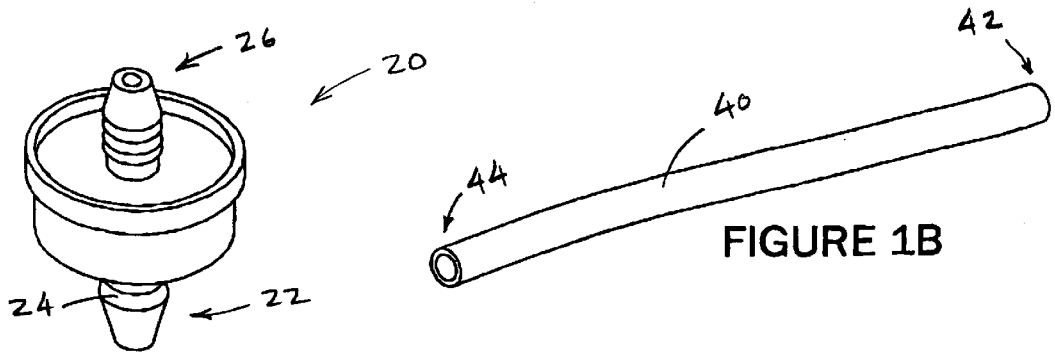
FIGURE 1A
FIGURE 1B
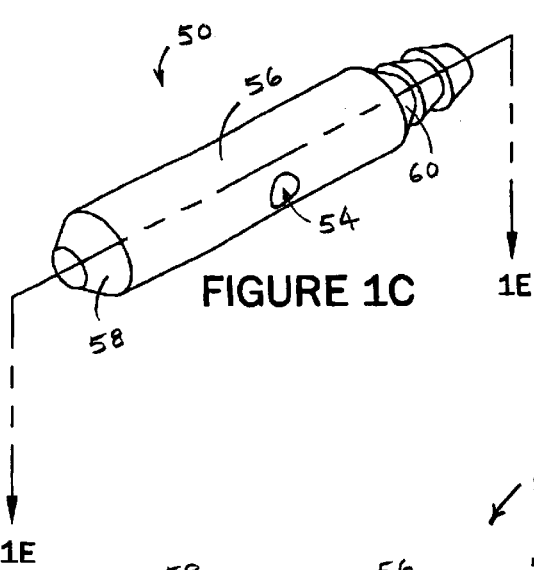
FIGURE 1C
FIGURE 1D
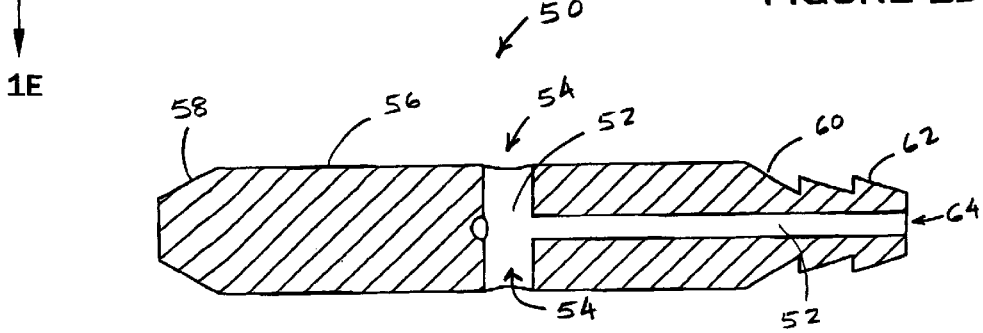
FIGURE 1E

IRRIGATION SYSTEM FOR GROWING PLANTS AT A GROWING FACILITY

FIELD OF THE INVENTION

The present invention relates to a drip irrigation system and the plants grown using such systems, and more particularly relates to a drip irrigation system having weighted drip emitters.

BACKGROUND OF THE INVENTION

The growth and sale of plants can be a substantial portion of the business of many businesses having a plant growing facility including greenhouses, home improvement stores and large discount stores. Thus, in view of the fact that one of the primary inputs in plant growth is water, watering or irrigation systems and the efficiency thereof are integral with the plant growth process and the extraction of optimum value from the sale of such plants.

Irrigation systems for plants, flowers and vegetables, etc. provide a continuing or periodic supply of moisture to the plants. Such systems may be of the subterranean type or may be of the above-ground type. Subterranean systems are generally costly, complex and require relatively permanent installations and are not readily capable of being modified or adapted to suit changing plant locations or to provide a source of moisture to plants that are potted or otherwise located above the subterranean source of moisture.

Above-ground type irrigation systems that are generally known may include sprinkler systems that distribute water over a generally broad area and often require the installation of permanent water lines and sprinkler hardware or require moving the sprinkler hardware to adapt to the irrigation needs of various plant configurations. Such known sprinkler-type irrigation systems are directed over a general area and not directed to the roots of a particular plant and therefore may also result in the use of excessive quantities of water.

Other generally known above-ground type irrigation systems may include porous hoses that seep water through the hose wall or that have apertures that emit a stream of water when the hose is under pressure. Such known hose irrigation systems often require routing the hose in a pathway or pattern above the planting soil and beneath the foliage to provide a water source in close proximity to the roots of each plant. Such known hoses often require excessive lengths to meet the irrigation needs of many plants and may result in damage to delicate foliage when placing, removing or relocating the hoses. Such known hoses also typically result in uneven water distribution due to the variation in water pressure along the length of the hose, inability of the hose porosity to compensate for pressure variations, and disbursement of water along the length of the hose rather than at discreet plant locations.

Irrigation systems may also include a supply pipe or hose having branch tubes extending therefrom. Such branch tubes may have an open or closed end and include small apertures or orifices for seeping water at plant locations, but generally do not provide a flexible irrigation system adaptable to a variety of plant irrigation needs due to the fixed length of the branch tubes and the pre-established orifice locations. Such branch tube irrigation systems typically do not emit the same amount of water to each of the plants along the length of the supply hose or pipe.

Accordingly, it would be advantageous to provide a drip irrigation system that is capable of adapting to plants of various heights and locations. It would also be advantageous to provide a drip irrigation system that emits water only at the desired location for a variety of plants. It would be further advantageous to provide a drip irrigation system that emits the same amount of water at each of the plant locations, regardless of pressure gradients along the supply hose or pipe, and prevents siphoning of water back to the supply hose or pipe when supply pressure is decreased. It would also be advantageous to provide a drip irrigation system that is easily adapted to changing plant patterns or locations. It would be further advantageous to provide a drip irrigation system that is easily and quickly installed or removed without damaging the plant.

Accordingly, one of the important advantages of the present invention would be the ability to profit from the sale of plants grown using an improved drip irrigation system or watering systems which incorporate an improved irrigation system, and other products which are normally sold with drip irrigation systems.

SUMMARY OF THE INVENTION

One embodiment of the invention relates to a drip irrigation system for delivering an irrigation fluid from an irrigation fluid supply source to one or more plants and includes at least one pressure regulation device in fluid communication with the irrigation fluid supply source, at least one fluid delivery device coupled in fluid communication to the pressure regulation device, and a weighted emitter coupled in fluid communication to the fluid delivery device.

Another embodiment of the invention relates to a kit for a drip irrigation system and includes at least one pressure regulation device adapted to be coupled to an irrigation fluid supply source, at least one elongated member having an internal passage adapted to couple to the pressure regulation device, at least one weighted emitter having an internal passage adapted to couple to the elongated member, and a package for the kit.

A further embodiment of the invention relates to a method of irrigating a plurality of plants and includes the steps of providing an irrigation fluid supply source adapted to contain pressurized irrigation fluid and coupling an inlet portion of at least one pressure compensating device to the irrigation fluid supply source, where the pressure compensating device is adapted to allow flow of the irrigation fluid at a reduced pressure to an outlet portion of the pressure compensating device. The embodiment also includes coupling a first end of at least one elongated tubular member in fluid communication to the outlet portion of the pressure compensating device, coupling a second end of the elongated tubular member in fluid communication with a weighted emitter, and positioning the weighted emitter in a plant.

Another embodiment of the invention relates to an indoor facility for growing plants and includes a structural enclosure having a controlled environment for growing a plurality of plants, an irrigation fluid supply source routed at least partially through the structural enclosure, at least one pressure regulating device coupled in fluid communication with the irrigation fluid supply source, at least one irrigation fluid delivery device having a first end coupled in fluid communication with the pressure regulating device, and a weighted emitter having an internal passage coupled to a second end of the irrigation fluid delivery device, where the weighted emitter is located near the plant to provide a source of irrigation fluid to the plant.

Another embodiment of the invention relates to an irrigation system for plants, including means for providing a pressurized source of irrigation fluid, means for discharging a flow of the irrigation fluid from the source at reduced pressure, means for routing the reduced pressure flow of the irrigation fluid to a plant location, and means for emitting the irrigation fluid at the plant location.

Another embodiment of the invention relates to an emitter for a drip irrigation system, and includes a weighted cylindrical shaped body portion, a passage extending at least partially through the body portion, at least one discharge opening in the body portion communicating with the passage, and an inlet portion on one end of the body portion having an inlet opening and an integrally formed retainer portion adapted to couple with a tube.

Another embodiment of the invention relates to a plant, grown using a drip irrigation process including positioning a weighted emitter in a watering relationship with the plant, the weighted emitter having a cylindrical body portion, a fluid inlet at an inlet end of the body portion, two fluid outlets, a passage through the weighted emitter connecting the inlet and the outlets, and a retention device at the inlet end adapted to receive and retain the tube, coupling the tube to the inlet end of the weighted emitter, and directing an irrigation fluid through the tube and the emitter to deliver a supply of irrigation fluid to the plant.

BRIEF DESCRIPTION OF THE DRAWINGS

FIG. 1 is a perspective view of a component of a drip irrigation system according to a preferred embodiment.

FIG. 1B is a perspective view of another component of a drip irrigation system according to a preferred embodiment.

FIG. 1C is a perspective view of another component of a drip irrigation system according to a preferred embodiment.

FIG. 1D is a perspective view of another component of a drip irrigation system according to a preferred embodiment.

FIG. 1E is a cross-sectional view of the component for a drip irrigation system of FIG. 1C along line 1E—1E, according to a preferred embodiment.

DETAILED DESCRIPTION OF THE PREFERRED EMBODIMENTS

Figure 2:
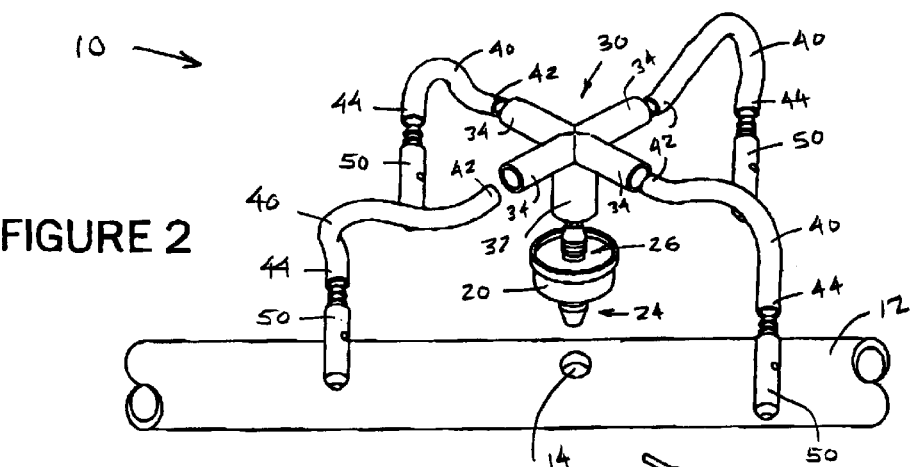
FIG. 2 is an exploded perspective view of a drip irrigation system according to a preferred embodiment.

Referring to FIG. 2, a drip irrigation system 10 for delivering fluids, such as water, fertilizer, pesticides, chemicals, selected mixtures thereof, etc. to plants is shown according to one embodiment. Drip irrigation system 10 includes an irrigation fluid supply source or device such as a hose, container, reservoir, etc. and shown schematically as a pipe or line 12. In one embodiment, line 12 is a PVC pipe having a diameter of one-half (½) inch, three-quarter (¾) inch or one (1) inch, but other materials, shapes and sizes may be used in alternative embodiments. Supply line 12 provides a source of irrigation fluids in the general vicinity of the plants to be irrigated. The irrigation fluid may be stored in a tank, bottle or other suitable reservoir (not shown) and maintained in a pressurized condition within supply line 12 by a pump (not shown), gravity head, water main supply pressure (see FIG. 5) or other suitable device.

Supply line 12 includes openings, shown schematically as orifices 14 located at desired locations established by a user along the length of supply line 12 to form an irrigation pattern for one or more plants. The irrigation pattern may be adapted to changing plant locations by creating more openings or closing existing openings with plugs (not shown) or other suitable devices.

According to one embodiment, a flow metering or pressure regulating device, shown schematically as pressure compensator 20, has a high pressure inlet end 22 adapted to be removably received in orifice 14 on the top side of the supply line 12 and retained by circumferential ridges, shown schematically as barbs 24 or other suitable structure. A distribution interface device, shown schematically as a branch header 30, has a body portion 32 adapted to be received on a low pressure outlet end 26 of pressure compensator 20 and multiple distribution connectors 34 (shown as four according to a particularly preferred embodiment) for distributing irrigation fluids from the pressure compensator to multiple branch lines 40. Branch lines 40 have a first end 42 coupled to distribution connectors 34 by any suitable means such as an interference fit, etc. and may be provided in any suitable length for delivering irrigation fluids to a plant. A second end 44 of branch lines 40 is adapted to receive a discharge device, shown schematically as an emitter 50. Emitter 50 is placed on or near the base of a plant to provide a drip irrigation source of fluid. In an alternative embodiment, a branch header may be omitted and the branch lines connected directly to the pressure compensators, or the branch header may have any number of distribution connectors, consistent with the regulating properties of the pressure compensator. In other alternative embodiments, the pressure compensator may be located remote from the supply line by routing an intermediate length of tubing between the supply line and the pressure compensator. In further alternative embodiments, the pressure compensator and branch header may be oriented at any location around the circumference of the supply line.

Referring to FIG. 1A, one embodiment of a pressure compensator is shown. Pressure compensator 20 is a compact, fluid pressure regulation device capable of receiving high pressure input fluid supply at inlet end 22 and emitting low pressure fluid corresponding to a steady-drip flow rate at emitters 50. The pressure regulation characteristics of compensator 20 also provide a shut-off function and an anti-siphoning function to prevent reverse flow of irrigation fluid when the irrigation fluid supply pressure is below a predetermined pressure. Use of multiple pressure compensators on a single supply line permits a consistent and generally equal amount of fluid to be dispensed to each emitter 50. Pressure compensator 20 may be provided in various sizes and pressure regulation capacities to adapt to specific plant needs and may be of a type commercially available from Kulker of France.

Referring to FIG. 1D, a distribution interface or branch header is shown. Branch header 30 is shown having four (4) distribution connectors 34 according to a particularly preferred embodiment, but may be provided with any number of distribution connectors suited to a particular irrigation system and having a pressure compensator having a correspondingly sized regulation capacity to provide the desired fluid volume at each emitter. Branch lines 40 may be removably received over the exterior 36 of distribution connector 30 or within the interior 38 of distribution connector 30.

Referring to FIG. 1B, a branch line is shown. Branch line 40 is a flexible, thin-walled, non-porous tubing connected between the distribution connectors 30 and the emitters 50. In one embodiment, branch lines 40 are Micro Poly Tube of a type commercially available from Action Technology of Clinton, Ill., and having a length that is cut-to-suit by a user in lengths preferably between six (6) inches and forty-eight (48) inches. In alternative embodiments, the branch line may be made of other materials or shapes and may be provided in various lengths suited for providing drip irrigation of fluids to plants.

Referring to FIGS. 1C and 1E, an emitter is shown. One embodiment of emitter 50 is an elongated member having internal passages 52 for receiving irrigation fluids from branch line 40 and emitting the fluids from either or both of outlets 54 to the plant. Passages 52 may be formed in the shape of a "T" with a single fluid inlet 64 and two lateral fluid discharge outlets 54 to reduce the flow speed of the fluid entering the plant or soil to minimize the potential for soil displacement, while the "T" shaped passage tends to minimize the potential for clogging or obstruction of the fluid flow path. In an alternative embodiment, the internal passages may be provided in any flow pattern suitable for providing a fluid discharge path that minimizes fluid velocity and resists clogging. Emitter 50 is preferably placed on or near the base of the plant or within the foliage of the plant to provide a drip source of irrigation fluids to the particular plant to be irrigated. Emitter 50 is weighted to improve its retention at the irrigation location of the plant. In one embodiment, emitter 50 has a cylindrical body portion 56 with tapered ends 58, 60 that allow the emitter 50 to be easily installed, removed or relocated without damage to the plant. The end 60 of emitter 50 having the inlet 64 to passage 52 may be provided with circumferential ridges, shown schematically as barbs 62, to improve the retention of branch line 40. In one embodiment, emitter 50 has a weight in the range of three (3) ounces to five (5) ounces and is preferably made of metal or other suitable material having sufficient mass such that, together with the flexible nature of the branch line, it may be located and retained in a desired position to irrigate a particular plant. In alternative embodiments, the emitter may have any suitable weight to correspond to the resiliency of the tubing and the emitter may be made of any streamlined shape to allow installation in, or removal from, a plant without damaging or injuring the plant foliage.

Figure 3:
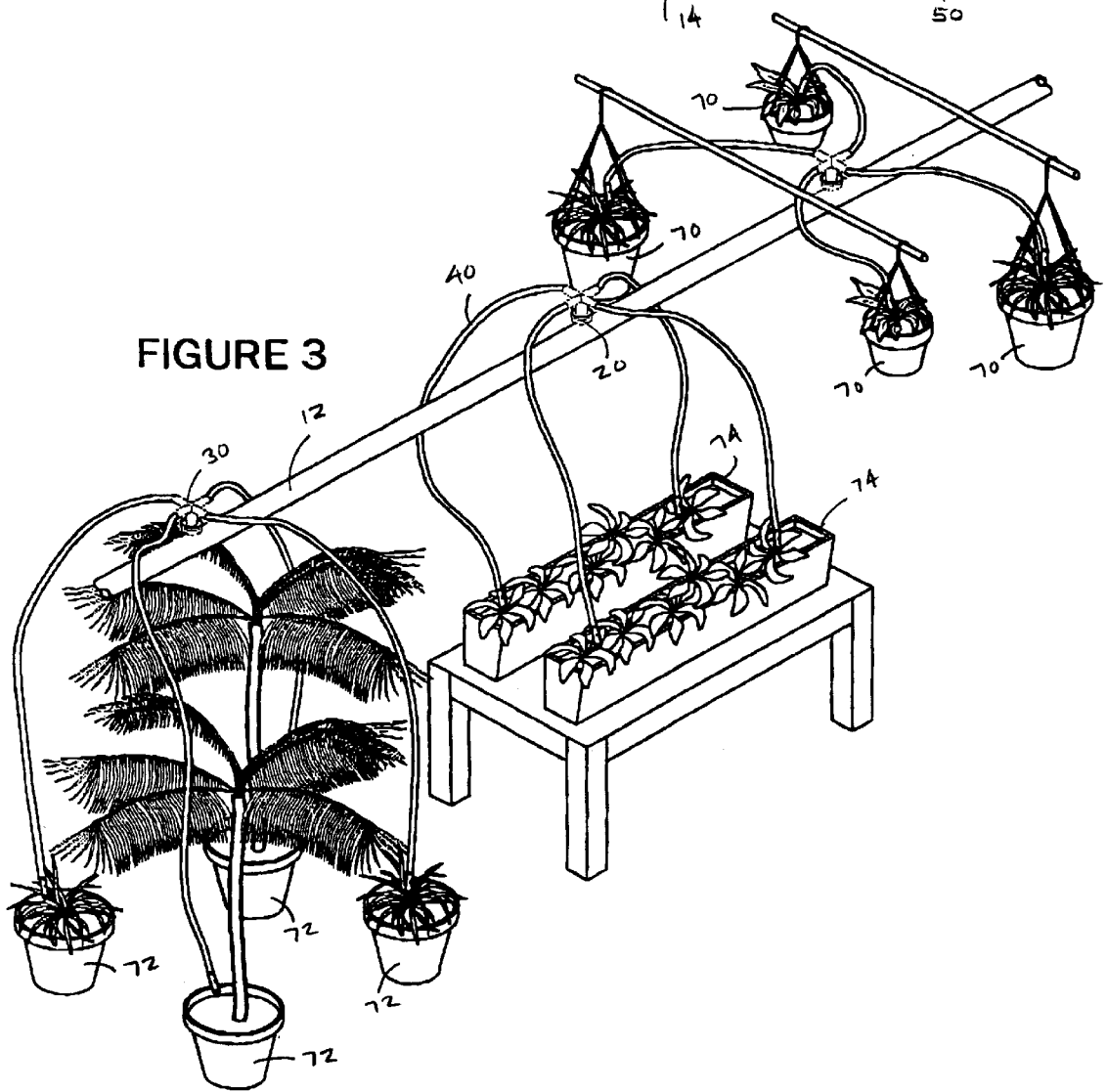
FIG. 3 is a perspective view of a drip irrigation system according to a preferred embodiment.

Referring to FIG. 3, a drip irrigation system for use with multiple plants is shown. Drip irrigation system 10 may include numerous pressure compensators 20 and corresponding branch headers 30, branch lines 40 and emitters 50 on either a single supply line 12 or multiple supply lines for providing irrigation fluids to multiple plants over a large area, while providing the desired amount of fluid to each plant corresponding to the pressure compensator capacity and the number of branch lines associated with each pressure compensator. The location of the pressure compensators 20 and the length of the branch lines 40, together with the weighted emitters 50, provides an irrigation system that may be adapted to supply irrigation fluids to a variety of plant configurations. For example, the system may be adapted to irrigate hanging plants 70, potted plants 72 having various heights or positioned on a floor, platform or other convenient surface, plants grown in trays or planter boxes 74, and plants growing directly from underlying soil (not shown). Drip irrigation system 10 may be adapted to alternative or changing plant irrigation needs by creating additional orifices and installing additional pressure compensators 20 in the supply line 12 or by relocating and plugging abandoned orifices.

Figure 4:
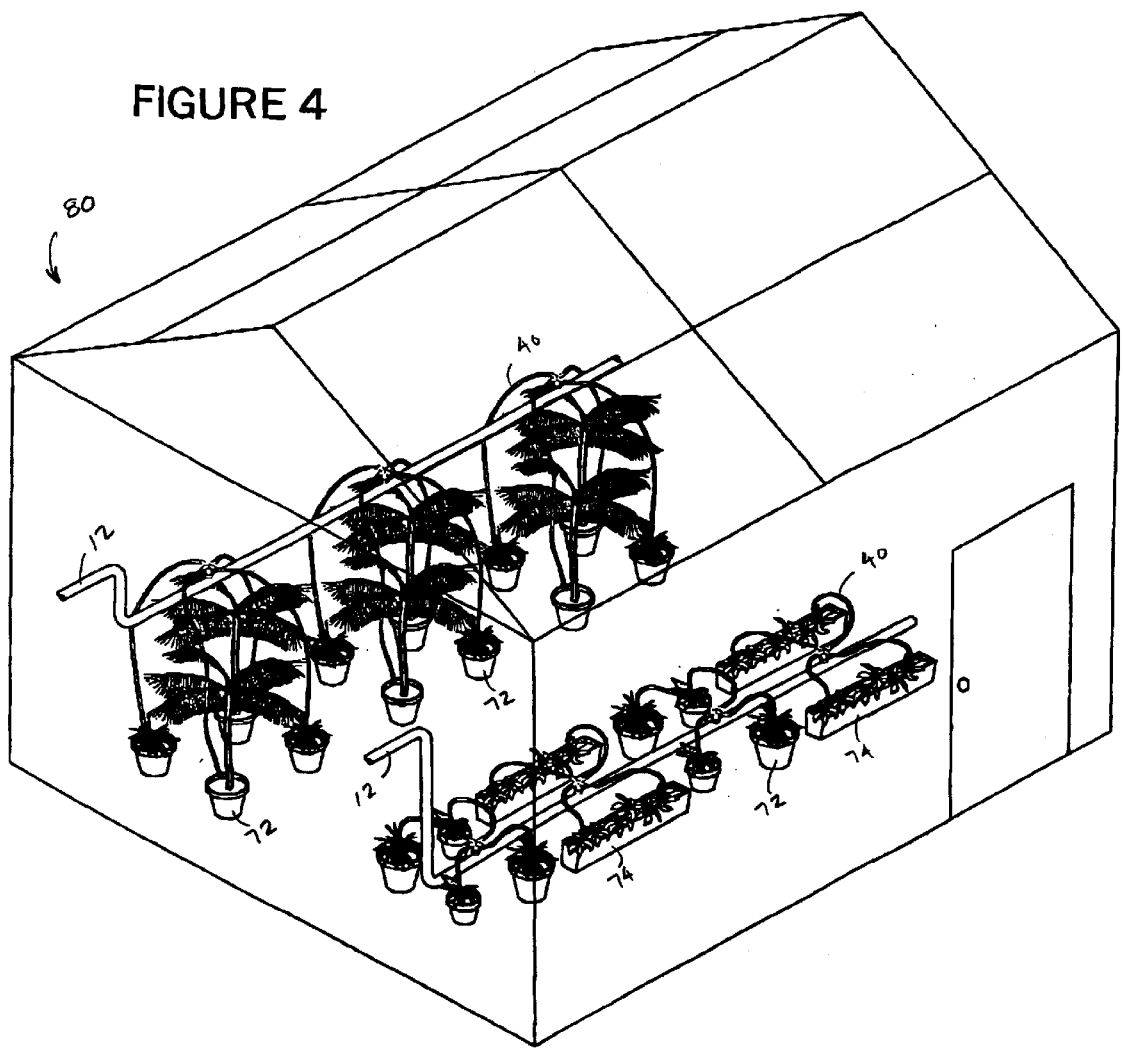
FIG. 4 is a perspective view of a drip irrigation system according to a preferred embodiment.

Referring to FIG. 4, an irrigation system adapted for use in a structure or growing facility having a controlled environment, such as a nursery or greenhouse facility, is shown according to one embodiment. Supply lines 12 may be routed at any suitable location and elevation within a structure (shown schematically as a greenhouse 80). Orifices may be provided in supply lines 12 at suitable locations and pressure compensators 20, branch headers 30, branch lines 40 and emitters 50 connected to provide a drip source for irrigation fluids at the desired plant locations. In alternative embodiments, the irrigation system may be used in any suitable facility such as a nursery, garden, landscape supply or other horticulture store or facility. The supply lines may be provided with couplings or quick-connectors for moving, relocating or rearranging the location of the supply lines to create alternative irrigation system patterns for the plants according to the particular needs of the facility.

Figure 5:
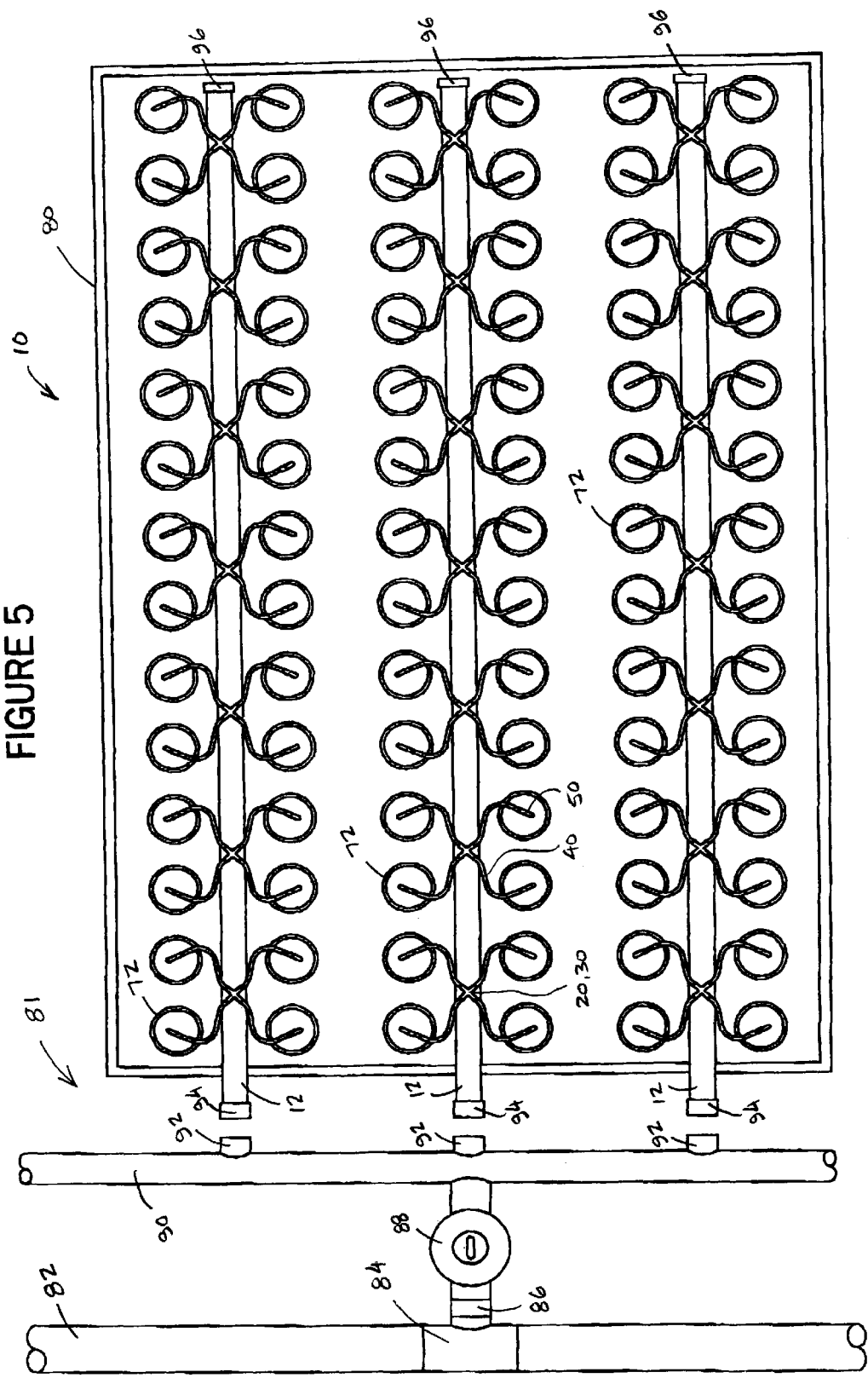
FIG. 5 is a top view of a drip irrigation system according to a preferred embodiment.

Referring to FIG. 5, an irrigation system for the plant-growing facility of FIG. 4 is shown. An actual installation of irrigation system 10 in a structure 80, such as a greenhouse, nursery, home improvement store, large discount store or other plant growing facility is shown schematically for a large volume of commercially grown plants. In one embodiment, irrigation system 10 includes a plumbing system 81 having a main water line 82 to provide a pressurized water source for the irrigation fluid. A fitting, such as a tee 84, on water line 82 directs a supply of water through an in-line filter 86 and a valve 88, such as a solenoid or manual valve, to a water manifold line 90. An electronic controller (not shown) may be provided to interface with valve 88 to control the operation of irrigation system 10. Additional filters, such as sand filters (not shown), may also be included to provide the desired water quality characteristics for irrigation purposes. Water manifold line 90 may have a multiple fittings (shown, for example, as three), such as tees 92 for coupling to multiple supply lines 12, which include a corresponding fitting 94 adapted for coupling to tees 92. Multiple pressure compensators 20, branch headers 30, branch lines 40 and emitters 50 are connected to provide a drip source for irrigation fluids to each of the plants. Supply lines 12 are provided with an end closure device 96, such as a cap or plug to contain the irrigation fluid and maintain pressure in supply line 12.

In any embodiment of the invention, commercial installations of the irrigation system and the plumbing system for the irrigation system include the following commercially available components: rigid PVC piping of one (1) inch, one and one-half (1½) inch or two (2) inch diameter for the main water line; Micro Poly Tube or other suitable tubing of 0.192 inch outside diameter for the branch lines; rigid PVC piping of three-quarter (¾) inch or one (1) inch diameter for the water manifold line; flexible PVC piping of one-half (½) inch, three-quarter (¾) inch or one (1) inch diameter for the supply line; valves, such as solenoid and manual valves, in sizes ranging from three quarter (¾) inch to two (2) inches; filters, such as in-line filters and sand filters; fittings such as tees, couplings and plugs of various sizes for interconnection of the lines, valves and filters; and electronic controllers for controlling the operation of the irrigation system.

It is important to note that the construction and arrangement of the elements of the drip irrigation system provided herein are illustrative only. Although only a few exemplary embodiments of the present invention have been described in detail in this disclosure, those skilled in the art who review this disclosure will readily appreciate that many modifications are possible in these embodiments (such as variations in installation location and orientation of the components of the system, sizes, structures, shapes and proportions of the various components, mounting arrangements, configuration and routing of the lines, etc.) without materially departing from the novel teachings and advantages of the invention. According to other alternative embodiments, the drip irrigation system may be used in connection with any environment or facility where a supply of irrigation fluids for plants is desirable. Further, it is readily apparent that variations of the system may be provided in a wide variety of routing configurations, pressure regulation capacities, emitter shapes, sizes, or fluid passage orientations and may be used in agricultural, commercial, institutional, industrial or residential applications. Additionally, the irrigation system may be controlled electronically or manually. Accordingly, all such modifications are intended to be within the scope of the invention as defined in the appended claims.

Notwithstanding the format of the claims defining the resulting present invention or the description of the preferred embodiment, the inventor hereof believes the claims should be interpreted to be read as broadly as permitted by the disclosure hereof and the prior art. To this extent, the inventor believes that the claims should be interpreted to protect the inventive irrigation system, methods and plants grown using the system, and business the inventor may have depending on product commercialization relating to such invention.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. An emitter for a drip irrigation system, comprising:
    a weighted body portion having a substantially uniform external wall extending between a first end and a second end;
    a passage extending from the first end to an intermediate location of the body portion;
    a first discharge opening in the external wall communicating with the passage;
    a second discharge opening in the external wall generally opposite the first discharge opening and communicating with the passage;
    an inlet portion on the first end of the body portion having an inlet opening communicating with the passage and an integrally formed retainer portion adapted to couple with a tube; and
    wherein the second end is closed.

2. The emitter of claim 1, wherein the emitter has a weight in the range of three to five ounces.

3. The emitter of claim 1, wherein the retainer portion comprises at least one external circumferential ridge configured to engage an interior of the tube.

4. The emitter of claim 1, wherein the passage is T-shaped.

5. The emitter of claim 1 wherein the tube is adapted to provide an irrigation fluid from an irrigation fluid supply source to the emitter.

6. The emitter of claim 1 wherein the emitter is a plurality of emitters and the tube is a plurality of substantially flexible tubes.

7. The emitter of claim 6 wherein the plurality of substantially flexible tubes comprise various lengths adapted for positioning of the plurality of emitters in a plurality of plants of various heights.

8. The emitter of claim 7 wherein the plurality of plants are potted plants adapted for growing within a plant-growing facility.

9. The emitter of claim 1 wherein the drip irrigation system is adapted for use in a facility adapted for growing plants.

10. The emitter of claim 1 wherein the tube is coupled to a pressure regulation device.

11. The emitter of claim 1 wherein the emitter is configured to receive and emit an irrigation fluid.

12. The emitter of claim 1 wherein the emitter is configured for placement in a plant.

13. The emitter of claim 1 wherein the emitter comprises a metallic material.

14. The emitter of claim 1 wherein the weight of the emitter is sufficient to configure the tube in a profile suited for positioning the emitter in a plant.

15. The emitter of claim 1 wherein the at least one discharge opening is configured to minimize clogging.

16. The emitter of claim 1 wherein the at least one discharge opening is configured to minimize soil displacement at a plant.

17. The emitter of claim 1 wherein the body portion comprises an elongated shape.

18. The emitter of claim 17 wherein the elongated shape is at least partially cylindrical and adapted for removable placement in a plant without damaging the plant.

19. The emitter of claim 1 wherein the retainer portion comprises at least one barb configured for engagement with the tube.

* * * * *